(12) United States Patent
Fitelson et al.

(10) Patent No.: US 12,416,728 B2
(45) Date of Patent: Sep. 16, 2025

(54) QUANTUM LIDAR SYSTEM

(71) Applicants: Michael Manuel Fitelson, Columbia, MD (US); Jane Noble Sprigg, Cantonsville, MD (US); Scott Ian Kelber, Columbia, MD (US)

(72) Inventors: Michael Manuel Fitelson, Columbia, MD (US); Jane Noble Sprigg, Cantonsville, MD (US); Scott Ian Kelber, Columbia, MD (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 793 days.

(21) Appl. No.: 17/746,692

(22) Filed: May 17, 2022

(65) Prior Publication Data

US 2023/0375708 A1 Nov. 23, 2023

(51) Int. Cl.
  *G01J 1/44* (2006.01)
  *G01S 7/48* (2006.01)
  *G01S 17/89* (2020.01)

(52) U.S. Cl.
  CPC .............. *G01S 17/89* (2013.01); *G01S 7/48* (2013.01)

(58) Field of Classification Search
  CPC ................... G01S 17/89; G01S 7/48
  See application file for complete search history.

(56) References Cited

U.S. PATENT DOCUMENTS

| | | | |
|---|---|---|---|
| 9,791,567 | B2 | 10/2017 | Habif |
| 10,107,680 | B2 * | 10/2018 | Capron .............. G01S 7/4917 |
| 2009/0284751 | A1 | 11/2009 | Drake, Jr. et al. |
| 2012/0076503 | A1 | 3/2012 | Habif |
| 2013/0089888 | A1 | 4/2013 | Woodward et al. |
| 2018/0038956 | A1 | 2/2018 | Habif |
| 2021/0156684 | A1 | 5/2021 | Huang |

OTHER PUBLICATIONS

Balaji: "Quantum Radar: Snake Oil or Good Idea?", 2018 International Carnahan Conference on Security Technology (ICCST), 2018, pp. 1-7, doi: 10.1109/CCST.2018.8585474.
Barzanjeh, et al.: "Microwave quantum illumination using a digital receiver", Science Advances • May 8, 2020 vol. 6, Issue 19 • DOI: 10.1126/sciadv.abb0451.

(Continued)

*Primary Examiner* — Rebecca C Bryant
(74) *Attorney, Agent, or Firm* — Tarolli, Sundheim, Covell &Tummino LLP

(57) ABSTRACT

One example includes a quantum lidar system. The system includes a beam generator configured to generate a signal beam and an idler beam and a beam combiner configured to generate a combined optical beam comprising the signal beam and the idler beam. The system also includes a lidar transmitter configured to transmit the combined optical beam to a target and a lidar receiver configured to receive the combined optical beam and a reflected beam of the combined optical beam reflected from the target to generate lidar data associated with the target.

20 Claims, 3 Drawing Sheets

(56) References Cited

OTHER PUBLICATIONS

Blakely: "Bounds on Probability of Detection Error in Quantum-Enhanced Noise Radar", U. S. Army Combat Capabilities Development Command Aviation and Missile Center, Redstone Arsenal, AL 35898, USA Quantum Rep. 2020, 2(3), 400-413; https://doi.org/10.3390/quantum2030028 Received: Jul. 2, 2020 / Revised: Jul. 14, 2020 / Accepted: Jul. 17, 2020 / Published: Jul. 21, 2020.

Chang, et al.: "Quantum-Enhanced Noise Radar", Appl. Phys. Lett. 114, 112601 (2019), arXiv:1812.03778 [quant-ph] or arXiv:1812.03778v1 [quant-ph] for this version) https://doi.org/10.48550/arXiv.1812.03778.

England, et al.: "Quantum-enhanced stando detection using correlated photon pairs", Phys. Rev. A 99, 023828 (2019), arXiv:1811.04113 [quant-ph] (or arXiv:1811.04113v1 [quant-ph] for this version) https://doi.org/10.48550/ arXiv.1811.04113.

Höijer, et al.: "Quantum Radar A survey of the science, technology and literature", FOI, FOI-R-4854-SE, ISSN 1650-1942 Dec. 2, 2019.

Li, et al.: "Dynamic Target Detection and Tracking Based on Quantum Illumination LIDAR", Tech Science Press, Journal of Quantum Computing, DOI:10.32604/jqc.2021.016634.

Liu, et al.—1: "Enhancing LIDAR performance metrics using continuous-wave photon-pair sources", arXiv:2004.06754 [physics.optics] (or arXiv:2004.06754v1 [physics.optics] for this version) https://doi.org/10.48550/arXiv.2004.06754.

Liu, et al.—2: "Enhancing LIDAR performance metrics using continuous-wave photon-pair sources", Optica, Research Article, vol. 6, No. 10/ Oct. 2019/Optica 1349-1355.

Liu, et al.—3: "Inspiring radar from quantum-enhanced lidar", 2020 IEEE International Radar Conference (RADAR), 2020, pp. 964-968, doi: 10.1109/RADAR42522.2020.9114825.

Murchie, et al.: "Theoretical comparison of quantum and classical illumination for simple detection-based LIDAR"; Optics (physics.optics); Quantum Physics (quant-ph) arXiv:2108.08281 [physics.optics] (or arXiv:2108.08281v1 [physics.optics] for this version) https://doi.org/10.48550/arXiv.2108.08281.

Wang, et al.: "Super-resolving quantum lidar: entangled coherent-state sources with binary-outcome photon counting measurement suffice to beat the shot-noise limit"; Received Nov. 24, 2015; revised Feb. 5, 2016; accepted Feb. 17, 2016; published Feb. 29, 2016 Mar. 7, 2016 | vol. 24, No. 5 | DOI:10.1364/OE.24.005045 | Optics Express 5045.

Zhang, et al.: "Multidimensional quantum-enhanced target detection via spectro-temporal correlation measurements"; Quantum Physics (quant-ph) arXiv:1909.09664 [quant-ph] (or arXiv:1909.09664v3 [quant-ph] for this version) https://doi.org/10.48550/arXiv.1909.09664.

International Search Report and Written Opinion for corresponding PCT/US2023/017592, dated Jul. 31, 2023, pp. 1-11.

* cited by examiner

QUANTUM LIDAR SYSTEM

TECHNICAL FIELD

The present invention relates generally to lidar systems, and specifically to a quantum lidar system.

BACKGROUND

Lidar is a type of sensor that can provide range-finding and/or imaging based on a laser. As an example, a lidar system can determining ranges (variable distance) by targeting an object with a laser and measuring the time for the reflected light to return to the receiver. A lidar system can also be used to create digital three-dimensional images of areas on terrestrial surfaces, on the ocean floor, and/or structures (e.g., buildings) thereon due to differences in laser return times and by varying laser wavelengths. A quantum lidar system can typically implement a nonlinear device to degeneratively create a signal beam and an idler beam from a single optical pump beam, such that the signal beam provided to the target and the idler beam provided to a local reference can be used to generate lidar data associated with the target.

SUMMARY

One example includes a quantum lidar system. The system includes a beam generator configured to generate a signal beam and an idler beam and a beam combiner configured to generate a combined optical beam comprising the signal beam and the idler beam. The system also includes a lidar transmitter configured to transmit the combined optical beam to a target and a lidar receiver configured to receive the combined optical beam and a reflected beam of the combined optical beam reflected from the target to generate lidar data associated with the target.

Another example includes a method for generating lidar data associated with a target. The method includes providing the combined optical beam to a lidar receiver. The method also includes transmitting the combined optical beam to the target, and receiving a reflected beam of the combined optical beam reflected from the target at the lidar receiver to generate the lidar data associated with the target based on the combined optical beam and the reflected beam.

Another example includes a quantum lidar system. The system includes a beam generator configured to generate a signal beam and an idler beam and a beam combiner configured to generate a combined optical beam comprising the signal beam and the idler beam. The signal beam and the idler beam can have unequal frequencies. The system also includes a lidar transmitter configured to transmit the combined optical beam to a target. The system further includes a lidar receiver. The lidar receiver includes a local detector configured to receive the combined optical beam and to generate a first detection signal associated with the combined optical beam. The lidar receiver also includes a target detector configured to receive a reflected beam of the combined optical beam reflected from the target and to generate a second detection signal associated with the reflected beam. The lidar receiver further includes a lidar processor configured to generate lidar data associated with the target based on the first and second detection signals.

DETAILED DESCRIPTION

The present invention relates generally to lidar systems, and specifically to a quantum lidar system. The quantum lidar system can be implemented for any of a variety of applications for range-finding and/or imaging. The quantum lidar system includes a beam generator that is configured to generate a signal beam and an idler beam. As an example, the signal and idler beams can be degeneratively created based on providing an optical pump beam through a nonlinear device. As an example, the nonlinear device can be a spontaneous parametric downconverter (SPDC) device, such as to generate the signal beam and the idler beams as having different frequencies. The quantum lidar system also includes a beam combiner that is configured to combine the signal beam and the idler beam to generate a combined optical beam. The beam combiner can be configured as a set of optics that can generate the combined optical beam and provide the combined optical beam to a lidar transmitter and to a lidar receiver.

The lidar transmitter can be configured to provide the combined optical beam to a target. The combined optical beam can be reflected from the target to provide a reflected beam. The lidar receiver can receive both the combined optical beam (e.g., from the beam combiner) and the reflected beam and can generate lidar data associated with the target based on the combined optical beam and the reflected beam. For example, the lidar receiver can include a lidar processor that can implement a delayed choice temporal convolution algorithm to generate the lidar data. Based on the quantum entanglement of the signal and idler beams in the combined optical beam provided to both the target and the lidar receiver, the lidar processor can greatly increase a signal-to-noise ratio (SNR) of the resultant lidar data based on determining a convolution peak of one of the signal and idler beams in the combined optical signal provided to the lidar receiver and the other of the signal and idler beams in the reflected beam provided to the lidar receiver.

Figure 1:
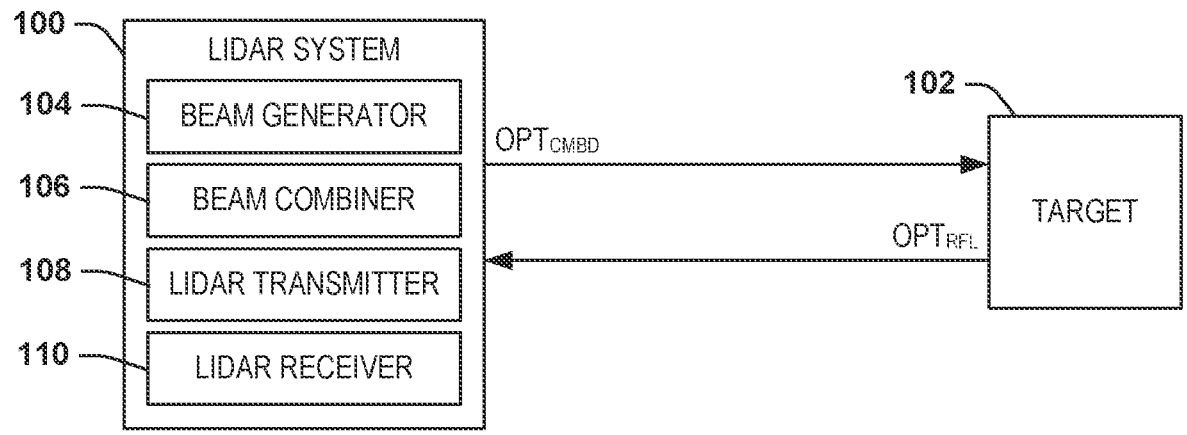
FIG. 1 illustrates an example block diagram of a quantum lidar system.

FIG. 1 illustrates an example block diagram of a quantum lidar system 100. The quantum lidar system 100 can be implemented in any of a variety of range-finding and/or imaging applications with respect to a target 102. The target 102 can correspond to geographic features (e.g., terrestrial, underwater, and/or surfaces of other celestial bodies) or to man-made structures, such as buildings or vehicles. Thus, the quantum lidar system 100 can be configured to determine a range to the target 102 and/or generate image data associated with the target 102.

The quantum lidar system 100 includes a beam generator 104 and a beam combiner 106. The beam generator 104 is configured to generate a signal beam and an idler beam that can be implemented in a quantum entangled beam (e.g., via a nonlinear device). The beam combiner 106 is thus configured to combine the signal beam and the idler beam to generate the quantum entangled beam, described hereinafter as a "combined optical beam". The combined optical beam, demonstrated in the example of FIG. 1 as a beam OPTCMBD, can therefore include both the signal beam and the idler beam having a common wavefront. As an example, the beam combiner 106 can include a variety of different types of optical devices to combine the signal beam and the idler beam. As described herein, the beam combiner 106 can generate the combined optical beam $OPT_{CMBD}$ such that the signal beam and the idler beam have a single photon entanglement.

The beam combiner 106 can provide the combined optical beam $OPT_{CMBD}$ to a lidar transmitter 108 and a lidar receiver 110. The lidar transmitter 108 is therefore configured to illuminate the target 102 with the combined optical beam $OPT_{CMBD}$. The combined optical beam $OPT_{CMBD}$ is thus reflected from the target 102 and provided back to quantum lidar system 100 as a reflected beam $OPT_{RFL}$ to be received by the lidar receiver 110. The lidar receiver 110 thus receives both the combined optical beam $OPT_{CMBD}$ and the reflected beam $OPT_{RFL}$, such that the lidar receiver 110 is configured to generate lidar data associated with the target 102 based on the combined optical beam $OPT_{CMBD}$ and the reflected beam $OPT_{RFL}$. As an example, the lidar receiver 110 can include a lidar processor that is configured to implement a temporal convolution algorithm on the combined optical beam $OPT_{CMBD}$ and the reflected beam $OPT_{RFL}$ to generate the lidar data associated with the target 102. The temporal convolution algorithm can be a delayed choice detection algorithm, such that the temporal convolution algorithm can be implemented at a time after receipt of the reflected beam $OPT_{RFL}$.

As an example, the lidar receiver 110 can include a local detector that is configured to monitor the combined optical beam $OPT_{CMBD}$ and a target detector that is configured to monitor the reflected beam $OPT_{RFL}$. Because the combined optical beam $OPT_{CMBD}$ includes both the signal beam and the idler beam, the reflected beam $OPT_{RFL}$ likewise includes the signal beam and the idler beam reflected back from the target 102. Therefore, the local detector of the lidar receiver 110 can agnostically detect one of the signal beam and the idler beam in the combined optical beam $OPT_{CMBD}$, and the target detector of the lidar receiver can agnostically detect the other one of the signal beam and the idler beam in the reflected beam $OPT_{RFL}$. As a result, the lidar processor can implement the temporal convolution algorithm in a manner that increases signal-to-noise ratio (SNR) for a stronger correlation between the combined optical beam $OPT_{CMBD}$ and the reflected beam $OPT_{RFL}$, and which obviates the need for a quantum memory. As a result, the quantum lidar system 100 can have a simpler design without the quantum memory, and can provide for more accurate lidar data associated with the target 102.

Figure 2:
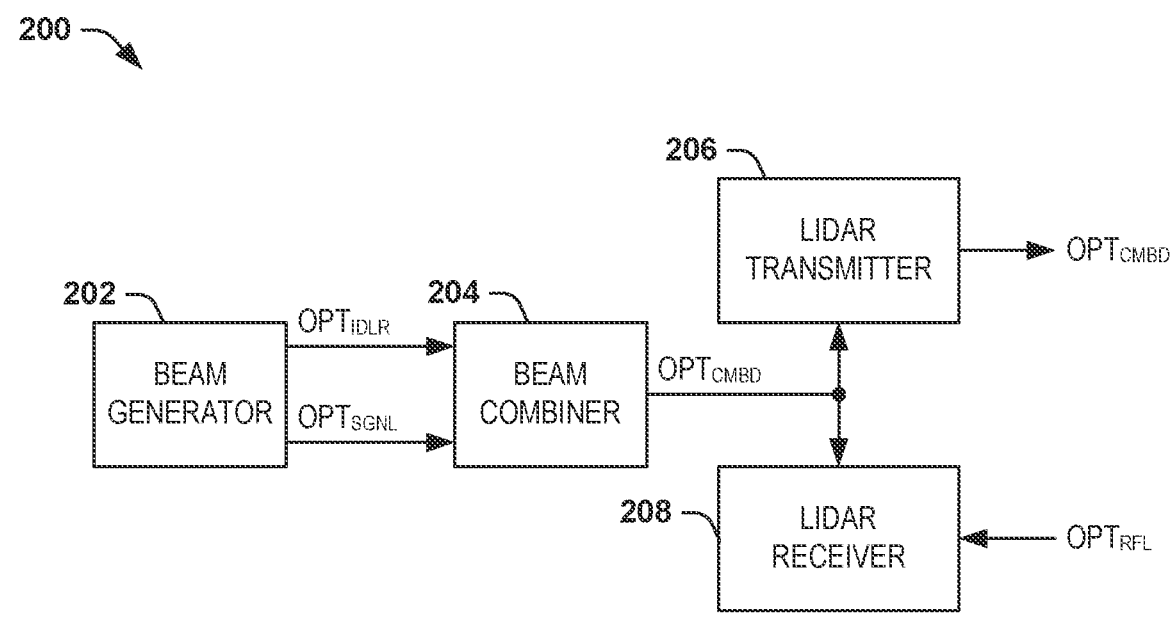
FIG. 2 illustrates another example block diagram of a quantum lidar system.

FIG. 2 illustrates another example block diagram of a quantum lidar system 200. The quantum lidar system 200 can correspond to the quantum lidar system 100 in the example of FIG. 1. Therefore, reference is to be made to the example of FIG. 1 in the following description of the example of FIG. 2.

The quantum lidar system 200 includes a beam generator 202. The beam generator 202 is configured to generate a signal beam $OPT_{SGNL}$ and an idler beam $OPT_{IDLR}$ that can be implemented in a quantum entangled beam. As an example, the signal beam $OPT_{SGNL}$ and the idler beam $OPT_{IDLR}$ can be generated based on a parametric degeneration process from an optical pump beam provided through a nonlinear device. For example, the beam generator 202 can include a spontaneous parametric downconverter (SPDC) to generate the signal beam $OPT_{SGNL}$ and the idler beam $OPT_{IDLR}$ from the optical pump beam. Therefore, the signal beam $OPT_{SGNL}$ and the idler beam $OPT_{IDLR}$ can be generated to have unequal frequencies. Therefore, the signal beam $OPT_{SGNL}$ and the idler beam $OPT_{IDLR}$ can be separately detected, as described in greater detail herein.

The quantum lidar system 200 also includes a beam combiner 204 that is configured to combine the signal beam $OPT_{SGNL}$ and the idler beam $OPT_{IDLR}$ to generate the combined optical beam $OPT_{CMBD}$. The combined optical beam $OPT_{CMBD}$ can therefore include both the signal beam $OPT_{SGNL}$ and the idler beam $OPT_{IDLR}$ having a common wavefront. As an example, the beam combiner 204 can include a variety of different types of optical devices to combine the signal beam and the idler beam. As another example, the beam combiner 204 can be combined with the beam generator 202, such that the beam generator 202 and the beam combiner 204 can include a set of optics that operate together to generate the combined optical beam $OPT_{CMBD}$ that includes the signal beam $OPT_{SGNL}$ and the idler beam $OPT_{IDLR}$. As an example, the beam combiner 204 can generate the combined optical beam $OPT_{CMBD}$ such that the signal beam $OPT_{SGNL}$ and the idler beam $OPT_{IDLR}$ have a single photon entanglement.

The beam combiner 204 can provide the combined optical beam $OPT_{CMBD}$ to a lidar transmitter 206 and a lidar receiver 208 (e.g., via optics). The lidar transmitter 206 is therefore configured to illuminate a target (e.g., the target 102) with the combined optical beam $OPT_{CMBD}$. The combined optical beam $OPT_{CMBD}$ is thus reflected from the target and provided back to quantum lidar system 200 as a reflected beam $OPT_{RFL}$ to be received by the lidar receiver 208. The lidar receiver 208 thus receives both the combined optical beam $OPT_{CMBD}$ and the reflected beam $OPT_{RFL}$, such that the lidar receiver 208 is configured to generate lidar data associated with the target based on the combined optical beam $OPT_{CMBD}$ and the reflected beam $OPT_{RFL}$. As an example, the lidar receiver 208 can include a lidar processor that is configured to implement a temporal convolution algorithm on the combined optical beam $OPT_{CMBD}$ and the reflected beam $OPT_{RFL}$ to generate the lidar data associated with the target. The temporal convolution algorithm can be a delayed choice detection algorithm, such that the temporal convolution algorithm can be implemented at a time after receipt of the reflected beam $OPT_{RFL}$.

Figure 3:
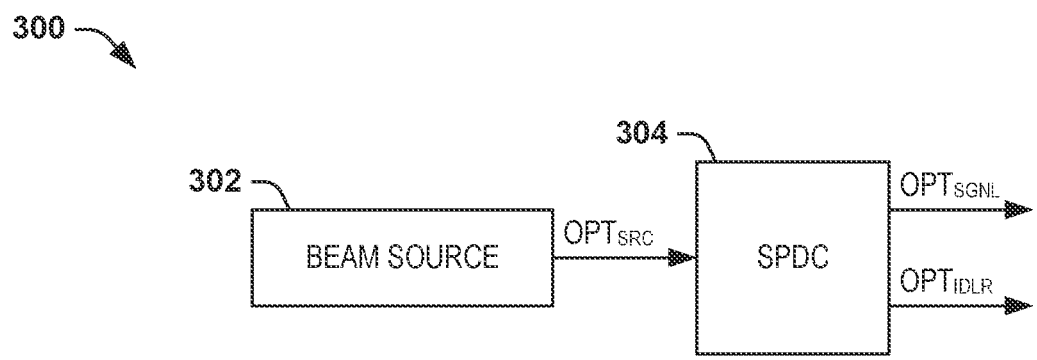
FIG. 3 illustrates an example block diagram of a beam generator and beam combiner.

FIG. 3 illustrates an example block diagram of a beam generator 300. The beam generator 300 can correspond to the beam generators 104 and 202 of the respective examples of FIGS. 1 and 2. Therefore reference is to be made to the examples of FIGS. 1 and 2 in the following description of the example of FIG. 3.

The beam generator 300 includes a beam source 302 that is configured to generate an optical pump beam $OPT_{PMP}$. The beam source 302 can be a laser, waveguide, optical fiber, or other component to provide the optical pump beam $OPT_{PMP}$. The beam generator 300 also includes an SPDC 304 that is configured to degeneratively create the signal beam $OPT_{SGNL}$ and the idler beam $OPT_{IDLR}$ from the optical pump beam $OPT_{PMP}$. For example, the signal beam $OPT_{SGNL}$ and the idler beam $OPT_{IDLR}$ can have unequal frequencies. While the example of FIG. 3 demonstrates that the nonlinear device that generates the signal beam $OPT_{SGNL}$ and the idler beam $OPT_{IDLR}$ is the SPDC 304, other types of nonlinear devices could be used instead. Additionally, as one example, the optical pump beam $OPT_{PMP}$ can be provided in a single pass through the SPDC 304 to provide for a single photon entanglement of the signal beam $OPT_{SGNL}$ and the idler beam $OPT_{IDLR}$.

Figure 4:
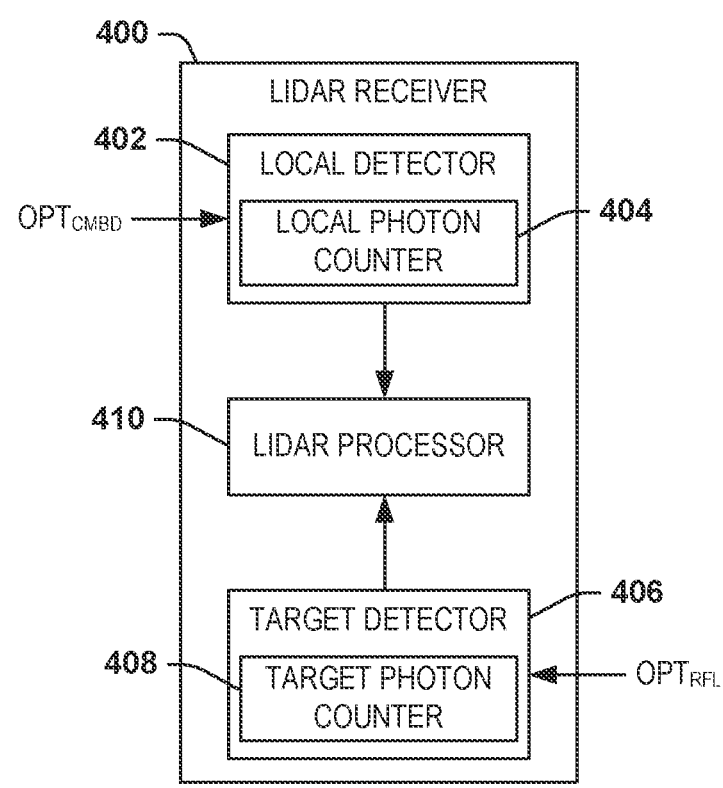
FIG. 4 illustrates an example block diagram of a lidar receiver.

FIG. 4 illustrates an example block diagram of a lidar receiver 400. The lidar receiver 400 can correspond to the lidar receiver 110 and the lidar receiver 208 in the respective examples of FIGS. 1 and 2. Therefore, reference is to be made to the examples of FIGS. 1 and 2 in the following description of the example of FIG. 4.

The lidar receiver 400 includes a local detector 402. The local detector 402 is configured to receive the combined optical beam $OPT_{CMBD}$ from the beam combiner (e.g., via optics). The local detector 402 includes a local photon counter 404 that is configured to monitor photons associated with either the signal beam $OPT_{SGNL}$ and the idler beam $OPT_{IDLR}$ of the combined optical beam $OPT_{CMBD}$. As an example, the local photon counter 404 can be tuned to the frequencies of the signal beam $OPT_{SGNL}$ and the idler beam $OPT_{IDLR}$, such that the local photon counter 404 can agnostically identify one of the signal beam $OPT_{SGNL}$ and the idler beam $OPT_{IDLR}$ in the combined optical beam $OPT_{CMBD}$.

The lidar receiver 400 also includes a target detector 406. The target detector 406 is configured to receive the reflected beam $OPT_{RFL}$ reflected back from the target (e.g., the target 102). The target detector 406 includes a target photon counter 408 that is configured to monitor photons associated with either the signal beam $OPT_{SGNL}$ and the idler beam $OPT_{IDLR}$ portions of the reflected beam $OPT_{RFL}$. As an example, the target photon counter 408 can be tuned to the frequencies of the signal beam $OPT_{SGNL}$ and the idler beam $OPT_{IDLR}$, such that the target photon counter 408 can agnostically identify one of the signal beam $OPT_{SGNL}$ and the idler beam $OPT_{IDLR}$ in the reflected beam $OPT_{RFL}$. The one of the signal beam $OPT_{SGNL}$ and the idler beam $OPT_{IDLR}$ that is detected by the target detector 406 is the opposite of the signal beam $OPT_{SGNL}$ and the idler beam $OPT_{IDLR}$ that is detected by the local detector 402. Therefore, the lidar receiver 400 can find a correlation between one of the signal beam $OPT_{SGNL}$ and the idler beam $OPT_{IDLR}$ in one of the combined optical beam $OPT_{CMBD}$ and the reflected beam $OPT_{RFL}$ and the other of the signal beam $OPT_{SGNL}$ and the idler beam $OPT_{IDLR}$ in the other of the combined optical beam $OPT_{CMBD}$ and the reflected beam $OPT_{RFL}$. For example, the quantum lidar system can exhibit a range accuracy of $0.5*C*\Delta T$, where C is the speed of light and $\Delta T$ is the response time of the local and target detectors 402 and 406.

In the example of FIG. 4, the local detector 402 is configured to generate a first detection signal $DET_1$ that corresponds to the respective one of the signal beam $OPT_{SGNL}$ and the idler beam $OPT_{IDLR}$ in the combined optical beam $OPT_{CMBD}$. Similarly, the target detector 406 is configured to generate a second detection signal $DET_2$ that corresponds to the respective other one of the signal beam $OPT_{SGNL}$ and the idler beam $OPT_{IDLR}$ in the reflected beam $OPT_{RFL}$. The detection signals $DET_1$ and $DET_2$ are provided to a lidar processor 410 that is configured to generate the lidar data associated with the target based on the detection signals $DET_1$ and $DET_2$.

As an example, the lidar processor 410 can implement a delayed choice temporal convolution algorithm on the detection signals $DET_1$ and $DET_2$ to generate the lidar data. For example, the lidar processor 410 can provide temporal synchronization of the local detector 402 and the target detector 406 over a period of time and store the time bins corresponding to the detection signals $DET_1$ and $DET_2$ to implement a delayed choice processing of the detection signals $DET_1$ and $DET_2$. The lidar processor 410 can then convolve the detection signals $DET_1$ and $DET_2$ with a variable time delay, such that sweeping the time delay across the range gate can provide a convolution peak corresponding to the time bins of maximum correlation between the detection signals $DET_1$ and $DET_2$. The time offset that corresponds to the convolution peak can thus correspond to the range to the target.

As described herein, the combined optical beam $OPT_{CMBD}$ that is provided to the local detector 402 includes both the signal beam $OPT_{SGNL}$ and the idler beam $OPT_{IDLR}$, and the combined optical beam $OPT_{CMBD}$ that is reflected from the target back to the target detector 406 likewise includes both the signal beam $OPT_{SGNL}$ and the idler beam $OPT_{IDLR}$. Based on implementing the quantized representation of the electric fields for the photons of the signal beam $OPT_{SGNL}$ and the idler beam $OPT_{IDLR}$, and by calculating the correlation between the combined optical beam $OPT_{CMBD}$ and the reflected beam $OPT_{RFL}$, only the entangled photons contribute to the convolution. Thus, only one of the signal beam $OPT_{SGNL}$ and the idler beam $OPT_{IDLR}$ of the combined optical beam $OPT_{CMBD}$ and the other one of the signal beam $OPT_{SGNL}$ and the idler beam $OPT_{IDLR}$ of the reflected beam $OPT_{RFL}$ contribute to the convolution, as determined at the local detector 402 and the target detector 406. Accordingly, the lidar processor 410 can determine the lidar data at a significantly higher SNR relative to typical lidar processing algorithms. Furthermore, because the time synchronized detections of the combined optical beam $OPT_{CMBD}$ and the reflected beam $OPT_{RFL}$ are performed separately in the delayed choice manner, the lidar receiver 400 does not need a quantum memory to determine the lidar data associated with the target.

Figure 5:
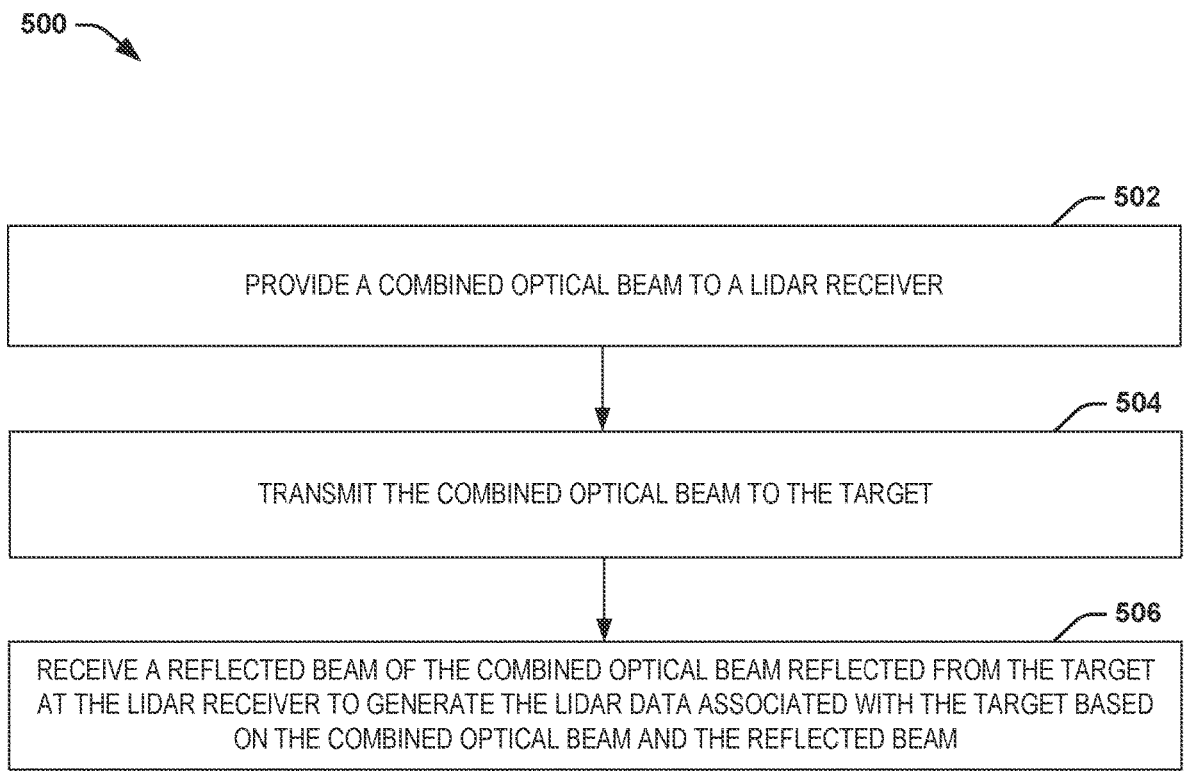
FIG. 5 illustrates an example of a method for generating lidar data associated with a target.

In view of the foregoing structural and functional features described above, a methodology in accordance with various aspects of the disclosure will be better appreciated with reference to FIG. 5. It is to be understood and appreciated that the method of FIG. 5 is not limited by the illustrated order, as some aspects could, in accordance with the present disclosure, occur in different orders and/or concurrently with other aspects from that shown and described herein. Moreover, not all illustrated features may be required to implement a methodology in accordance with an aspect of the present examples.

FIG. 5 illustrates an example of a method 500 for generating lidar data associated with a target (e.g., the target 102). At 502, a combined optical beam (e.g., the combined optical beam $OPT_{CMBD}$) is provided to a lidar receiver (e.g., the lidar receiver 110). The combined optical beam includes a signal beam and an idler beam. At 504, the combined optical beam is transmitted to the target. At 506, a reflected beam (e.g., the reflected beam $OPT_{RFL}$) of the combined optical beam reflected from the target is received at the lidar receiver to generate the lidar data associated with the target based on the combined optical beam and the reflected beam.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A quantum lidar system comprising:
a beam generator configured to generate a signal beam and an idler beam;
a beam combiner configured to generate a combined optical beam comprising the signal beam and the idler beam;
a lidar transmitter configured to transmit the combined optical beam to a target; and
a lidar receiver configured to receive the combined optical beam and a reflected beam of the combined optical beam reflected from the target to generate lidar data associated with the target.

2. The system of claim 1, wherein the beam generator comprises:
a beam source configured to generate a pump beam; and
a nonlinear device configured to degenerate the pump beam into the signal beam and the idler beam.

3. The system of claim 2, wherein the nonlinear device is arranged as a spontaneous parametric down-conversion device.

4. The system of claim 2, wherein the nonlinear device is configured to degenerate the pump beam into the signal beam having a first frequency and the idler beam having a second frequency that is not equal to the first frequency.

5. The system of claim 1, wherein the beam combiner comprises a set of optics configured to combine the signal beam and the idler beam to generate the combined optical beam, and to provide the combined optical beam to the lidar transmitter and the lidar receiver.

6. The system of claim 1, wherein the lidar receiver comprises:
a local detector configured to receive the combined optical beam and to generate a first detection signal associated with the combined optical beam;
a target detector configured to receive the reflected beam and to generate a second detection signal associated with the reflected beam; and
a lidar processor configured to generate the lidar data based on the first and second detection signals.

7. The system of claim 6, wherein the lidar processor is configured to implement a temporal convolution algorithm on the first detection signal and the second detection signal to generate the lidar data.

8. The system of claim 7, wherein the lidar processor is configured to implement the temporal convolution algorithm as a delayed choice detection algorithm.

9. The system of claim 7, wherein the temporal convolution algorithm is configured to determine a convolution peak between one of the signal beam and the idler beam associated with the combined optical beam and the other of the signal beam and the idler beam associated with the reflected optical beam.

10. A method for generating lidar data associated with a target, the method comprising:
providing a combined optical beam to a lidar receiver, the combined optical beam comprising a signal beam and an idler beam;
transmitting the combined optical beam to the target; and
receiving a reflected beam of the combined optical beam reflected from the target at the lidar receiver to generate the lidar data associated with the target based on the combined optical beam and the reflected beam.

11. The method of claim 10, further comprising:
generating a pump beam; and
degenerating the pump beam into the signal beam and the idler beam via a nonlinear device.

12. The method of claim 11, wherein degenerating the pump beam comprises degenerating the pump beam into the signal beam and the idler beam via a spontaneous parametric down-conversion device.

13. The method of claim 11, wherein degenerating the pump beam comprises degenerating the pump beam into the signal beam having a first frequency and the idler beam having a second frequency that is not equal to the first frequency.

14. The method of claim 11, further comprising:
generating a first detection signal associated with the combined optical beam provided to the lidar receiver;
generating a second detection signal in response to receiving the reflected beam; and
implementing a temporal convolution algorithm on the first detection signal and the second detection signal to generate the lidar data.

15. The method of claim 14, wherein implementing the temporal convolution algorithm comprises implementing the temporal convolution algorithm as a delayed choice detection algorithm.

16. A quantum lidar system comprising:
a beam generator configured to generate a signal beam and an idler beam;
a beam combiner configured to generate a combined optical beam comprising the signal beam and the idler beam, wherein the signal beam and the idler beam have unequal frequencies;
a lidar transmitter configured to transmit the combined optical beam to a target; and
a lidar receiver comprising:
a local detector configured to receive the combined optical beam and to generate a first detection signal associated with the combined optical beam;
a target detector configured to receive a reflected beam of the combined optical beam reflected from the target and to generate a second detection signal associated with the reflected beam; and
a lidar processor configured to generate lidar data associated with the target based on the first and second detection signals.

17. The system of claim 16, wherein the beam generator comprises:
a beam source configured to generate a pump beam; and
a spontaneous parametric down-conversion device configured to degenerate the pump beam into the signal beam having a first frequency and the idler beam having a second frequency that is not equal to the first frequency.

18. The system of claim 16, wherein the lidar processor is configured to implement a temporal convolution algorithm on the first detection signal and the second detection signal to generate the lidar data.

19. The system of claim 18, wherein the lidar processor is configured to implement the temporal convolution algorithm as a delayed choice detection algorithm.

20. The system of claim 18, wherein the temporal convolution algorithm is configured to determine a convolution peak between one of the signal beam and the idler beam associated with the combined optical beam and the other of the signal beam and the idler beam associated with the reflected optical beam.

* * * * *